United States Patent
Nagasaka (10) Patent No.: US 11,606,476 B2
(45) Date of Patent: Mar. 14, 2023

(54) INFORMATION PROCESSING APPARATUS AND STORAGE MEDIUM FOR GENERATING A GRAY IMAGE PRINT DATA FROM COLOR IMAGE DATA

(71) Applicant: CANON KABUSHIKI KAISHA, Tokyo (JP)

(72) Inventor: Hitoshi Nagasaka, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/378,253

(22) Filed: Jul. 16, 2021

(65) Prior Publication Data

US 2021/0344812 A1    Nov. 4, 2021

Related U.S. Application Data

(63) Continuation of application No. 16/711,201, filed on Dec. 11, 2019, now Pat. No. 11,095,794.

(30) Foreign Application Priority Data

Dec. 19, 2018 (JP) ............................. JP2018-237513

(51) Int. Cl.
*H04N 1/40* (2006.01)
*H04N 1/00* (2006.01)
*H04N 1/60* (2006.01)

(52) U.S. Cl.
CPC ..... *H04N 1/40012* (2013.01); *H04N 1/00188* (2013.01); *H04N 1/6013* (2013.01); *H04N 1/6027* (2013.01)

(58) Field of Classification Search
None
See application file for complete search history.

(56) References Cited

U.S. PATENT DOCUMENTS

| 8,995,024 | B2 * | 3/2015 | Ido | G06K 15/1878 |
| | | | | 358/3.27 |
| 2004/0080789 | A1 * | 4/2004 | Anderson | H04N 1/40012 |
| | | | | 358/3.21 |
| 2011/0122453 | A1 * | 5/2011 | Harada | H04N 1/32144 |
| | | | | 358/3.28 |

(Continued)

FOREIGN PATENT DOCUMENTS

| CN | 1890677 A | 1/2007 |
| CN | 101035188 A | 9/2007 |

(Continued)

*Primary Examiner* — Dung D Tran
(74) *Attorney, Agent, or Firm* — Canon U.S.A., Inc. IP Division (57) ABSTRACT

An information processing apparatus includes at least one memory device that stores a set of instructions, and at least one processor that executes the set of instructions. The set of instructions includes instructions to acquire color data from an application, set a generation method for generating gray image data from color data by selecting a method from a group including at least a first generation method and a second generation method different from the first generation method, generate PDL data of gray image data based on the acquired color data and the set generation method, and transmit the generated PDL data to a printing apparatus.

13 Claims, 11 Drawing Sheets

(56) References Cited

U.S. PATENT DOCUMENTS

| | | | | |
|---|---|---|---|---|
| 2014/0078555 A1* | 3/2014 | Kim | ................. | H04N 1/6016 |
| | | | | 358/3.27 |
| 2014/0139884 A1* | 5/2014 | Iinuma | ............... | G06K 15/1868 |
| | | | | 358/3.09 |
| 2018/0249043 A1* | 8/2018 | Ikeda | ................. | H04N 1/40012 |

FOREIGN PATENT DOCUMENTS

| | | | |
|---|---|---|---|
| CN | 101197918 A | | 6/2008 |
| CN | 107409210 A | | 11/2017 |
| CN | 108628555 A | | 10/2018 |
| JP | 2017-38242 A | | 2/2017 |
| JP | 2017038242 A | * | 2/2017 |

\* cited by examiner

FIG. 1

Prior Art

| R | G | B |
|---|---|---|
| 255 | 171 | 37 |
| 0 | 5 | 0 |
| 200 | 11 | 5 |
| 124 | 55 | 48 |
| 67 | 79 | 105 |
| 12 | 67 | 255 |
| 67 | 255 | 0 |

FIG. 8B

| R | G | B | ACHROMATIC VALUE |
|---|---|---|---|
| 255 | 171 | 37 | 181 |
| 0 | 5 | 0 | 3 |
| 200 | 11 | 5 | 67 |
| 124 | 55 | 48 | 75 |
| 67 | 79 | 105 | 78 |
| 12 | 67 | 255 | 72 |
| 67 | 255 | 0 | 170 |

FIG. 8C

| R | G | B | ACHROMATIC VALUE |
|---|---|---|---|
| 0 | 5 | 0 | 3 |
| 12 | 67 | 255 | 72 |
| 124 | 55 | 48 | 75 |
| 67 | 79 | 105 | 78 |
| 200 | 11 | 5 | 67 |
| 67 | 255 | 0 | 170 |
| 255 | 171 | 37 | 181 |

FIG. 8D

| R | G | B | ACHROMATIC VALUE |
|---|---|---|---|
| 0 | 5 | 0 | 0 |
| 12 | 67 | 255 | 36 |
| 124 | 55 | 48 | 73 |
| 67 | 79 | 105 | 109 |
| 200 | 11 | 5 | 146 |
| 67 | 255 | 0 | 182 |
| 255 | 171 | 37 | 219 |

```
←%-12345X@PJL  JOB
@PJL SET USERNAME = "User1"
@PJL SET JOBNAME = "TestJOB"
@PJL SET STRINGCODESET = UTF8
@PJL SET BITSPERPIXEL = 8
@PJL SET RESOLUTION = 600
 .
 .
 .
@PJL SET DISTINCTIVENESS = TRUE       ~1101
 .
 .
 .
```

INFORMATION PROCESSING APPARATUS AND STORAGE MEDIUM FOR GENERATING A GRAY IMAGE PRINT DATA FROM COLOR IMAGE DATA

CROSS-REFERENCE TO RELATED APPLICATION

This application is a Continuation of U.S. application Ser. No. 16/711,201, filed Dec. 11, 2019, which claims the benefit of Japanese Patent Application No. 2018-237513, filed Dec. 19, 2018, which is hereby incorporated by reference herein in its entirety.

BACKGROUND OF THE INVENTION

Field of the Invention

The present invention relates to a process of generating a gray image print data from color image data.

Description of the Related Art

When color image data expressed in an RGB color format or the like is converted to grayscale image data and is output, RGB signal values of the input image data are converted to achromatic color signal values. The grayscale conversion may be accomplished by performing NTSC conversion or the like such that signal values of R, G, and B are respectively weighted by particular constant factors in the conversion thereby obtaining achromatic color signal values.

Figure 1:
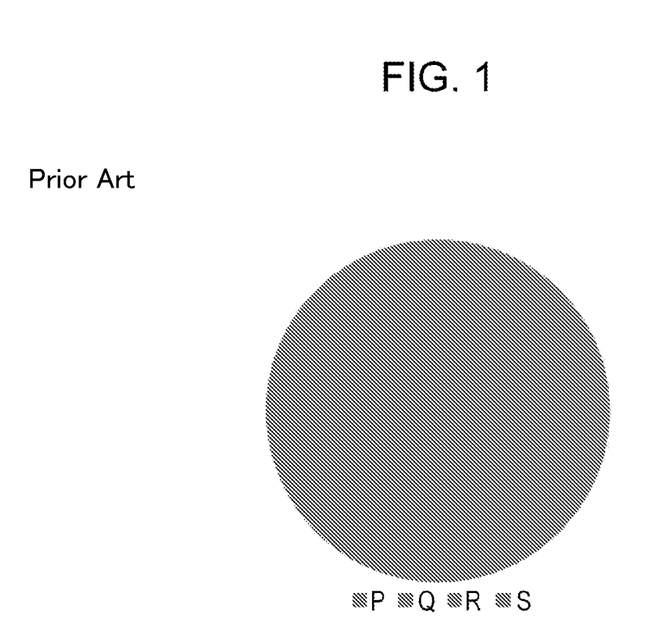
FIG. 1 is a diagram illustrating an example of a graph with low discrimination.

In the grayscale conversion, there is a possibility that different colors in color image data are converted to signal values which are equal or similar to each other. Therefore, there is a possibility that, after grayscale conversion, it becomes difficult to distinguish between even areas that are expressed in different colors and can be distinguished from each other in original color image data. In particular, in a case where achromatic colors with close signal values are located directly adjacent to each other as shown in FIG. 1, it is difficult to detect boundaries between colors. In the present specification, an index indicating the ease of distinguishing colors is referred to as discrimination, and when it is easy to distinguish among different colors, this state is referred to as a high-discrimination state.

There is a technique for obtaining a high-discrimination image even after grayscale conversion is performed. Japanese Patent Laid-Open No. 2017-38242 discloses a printing apparatus in which input PDL (Page Description Language) data is analyzed to detect colors, objects, and/or the like used in each page, and the number of colors used in color image data is determined. Then, using the value of the number of colors, the input PDL data is converted such that there is an equal difference between each two adjacent achromatic color signal values.

However, when the printing apparatus is not capable of performing high-discrimination grayscale conversion from color information included in the PDL data, it is difficult to obtain a high-discrimination grayscale image from the input color image data. In a case where a printing apparatus receives print jobs from a plurality of printer drivers, each of the print jobs is analyzed and image data for printing is generated. After that, printing is executed. If a high-discrimination grayscale conversion process is performed at the printing apparatus, this results in an increase in the amount of processing performed by the printing apparatus, and thus an increase occurs in time spent before starting a following job.

SUMMARY OF THE INVENTION

The present invention provides an information processing apparatus including at least one memory device that stores a set of instructions, and at least one processor that executes the set of instructions, the set of instructions comprising instructions to acquire color data from an application, set a generation method for generating gray image data from color data by selecting a method from a group including at least a first generation method and a second generation method different from the first generation method, generate PDL data of gray image data based on the acquired color data and the set generation method, and transmit the generated PDL data to a printing apparatus.

Further features of the present invention will become apparent from the following description of exemplary embodiments with reference to the attached drawings.

DESCRIPTION OF THE EMBODIMENTS

Embodiments of the present invention are described below with reference to drawings.

In the embodiments described below, a printer driver in a printing system converts color image data into grayscale PDL data for printing in a single color of K, and outputs resultant grayscale PDL data to a printing apparatus.

Figure 2:
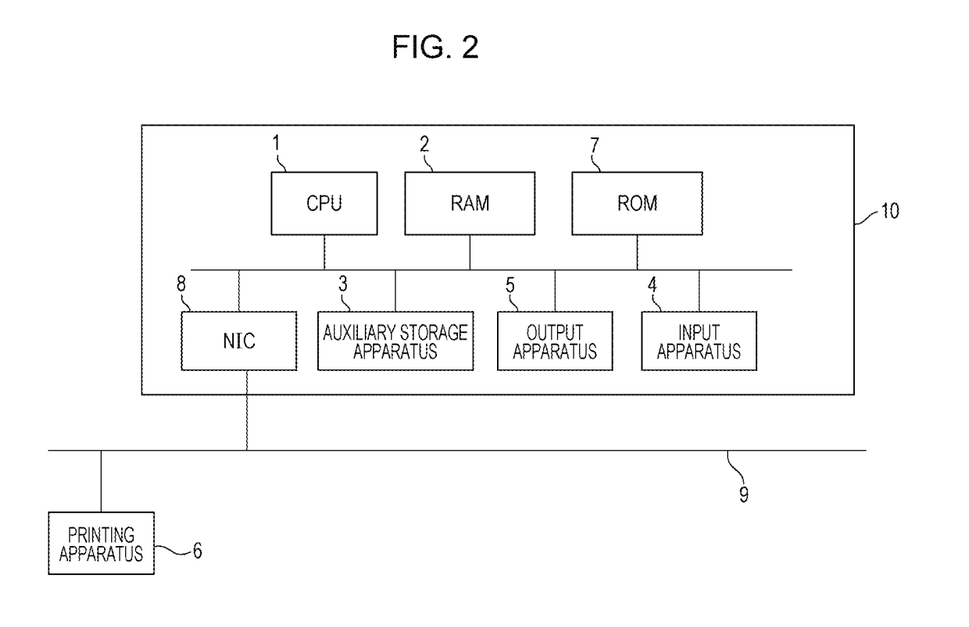
FIG. 2 is a diagram illustrating an example of a configuration of an information processing apparatus according to an embodiment.

First, with reference to FIG. 2, a printing system including an information processing apparatus 10 and a printing apparatus 6 according to the present embodiment is described below.

A CPU 1 is a control unit that controls the entire information processing apparatus 10. An auxiliary storage apparatus 3 is a storage medium such as an HDD, SSD, FD, CD-ROM, or IC memory card, and is used to store system programs and application programs.

A RAM 2 is used by the CPU 1 as a work memory in which a program or an application is loaded from the auxiliary storage apparatus 3.

The CPU 1 loads a system program and an application program stored in the auxiliary storage apparatus 3 into the RAM 2 thereby analyzing input image data, and outputting print data to the printing apparatus 6.

An output apparatus 5 is a display apparatus such as a display. An input apparatus 4 is a device such as a keyboard, a pointing device, and/or the like operated by a user for inputting.

Image data generated by the information processing apparatus 10 is transmitted from a NIC 8 (Network Interface) to the printing apparatus 6 via a network 9. In the present embodiment, the printing apparatus 6 is an SFP such as a printer, or an MFP having both the scanner function and the copy function.

Figure 3:
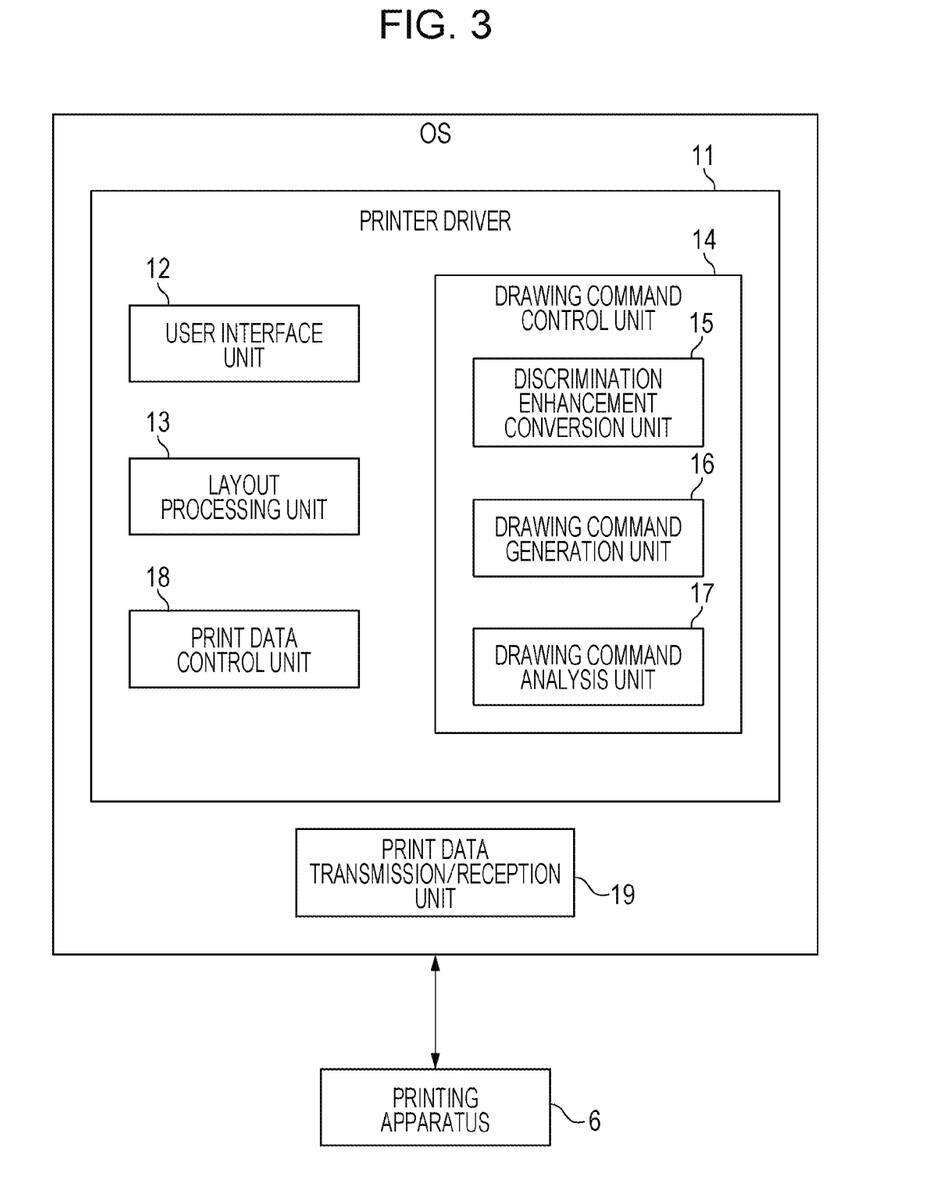
FIG. 3 is a diagram illustrating an example of a software-module configuration of an information processing apparatus according to an embodiment.

FIG. 3 is a diagram illustrating an example of a software configuration of the information processing apparatus 10 according to the present embodiment. Processing units 12 to 19 are realized by the CPU 1 by loading a program stored in the auxiliary storage apparatus 3 into the RAM 2 and executing it.

A printer driver 11 is a program that is executed on an OS of the information processing apparatus 10 to control the printing apparatus. The printer driver 11 includes modules that respectively function as the processing units 12 to 18. The printer driver is provided for each drawing language. For example, a GDI printer driver is a printer drive that interprets GDI (Graphics Device Interface) and generates PDL (Page Description Language) data. Another example is an XPS printer driver that interprets XPS (XML Paper Specification) and generates PDL data.

A user interface unit 12 is a software module that receives inputting, by a user, to the information processing apparatus 10 and controls displaying of a screen on the output apparatus 5. The user interface unit 12 outputs a printer driver setting screen to the output apparatus 5 and accepts inputting performed by a user using the input apparatus 4 via a screen displayed on the output apparatus 5.

A layout processing unit 13 performs a process of converting image data into a layout employed in printing the image data, in accordance with a print instruction issued by an application that produces a document or the like. For example, when a user instructs N-up or enlargement/reduction via the driver, the layout processing unit 13 converts the image data according to a specified value.

A drawing command control unit 14 receives a drawing command from the layout processing unit 13 and generates image data processable by the printing apparatus. In the present embodiment, the drawing command control unit 14 generates high-discrimination grayscale image data. The high-discrimination grayscale image data generated by the drawing command control unit 14 is transmitted to the printing apparatus 6. The drawing command control unit 14 includes a grayscale conversion unit 15, a drawing command generation unit 16, and a drawing command analysis unit 17. The drawing command control unit 14 operates as a grayscale conversion unit configured to generate grayscale PDL data. In this specification, an index indicating the ease of distinguishing colors is called discrimination, and a state where it is easy to distinguish among different colors is referred to as a high-discrimination state.

The drawing command analysis unit 17 is a module configured to analyze a drawing command included in the color image data received from the application. In a case where it is determined that color image data received from the application is set to be converted to a high-discrimination grayscale image, the drawing command analysis unit 17 transfer the color image data to the grayscale conversion unit 15. In a case where color data received from the application is not set to perform high-discrimination grayscale conversion, the drawing command analysis unit 17 transfer the color image data to the drawing command generation unit 16.

The grayscale conversion unit 15 performs grayscale conversion, different from other grayscale conversion such as NTSC conversion in which weighting by constant factors is performed, thereby generating high-discrimination grayscale image data.

The drawing command generation unit 16 generates image data in a format such as PDL data format that can be analyzed by a printing apparatus, based on the drawing command transferred from the grayscale conversion unit 15 or the drawing command analyzed by the drawing command analysis unit 17.

The print data control unit 18 generates PJL (Print Job Language) data to be transmitted to the printing apparatus 6 together with the drawing command generated by the drawing command generation unit 16. The PJL data is data for controlling a print job in terms of, for example, paper used for printing, paper discharge tray used for paper discharge, a color/monochrome setting value, and/or the like.

The print data transmission/reception unit 19 is a software module that transmits the PDL command generated by the drawing command generation unit 16 and the PJL data generated by the print data control unit 18 to the printing apparatus 6. More specifically, the CPU 1 operates as the print data transmission/reception unit 19 and controls the NIC 8 such that print data generated by the drawing command control unit 14 or by the print data control unit 18 is output to the printing apparatus 6.

Figure 4:
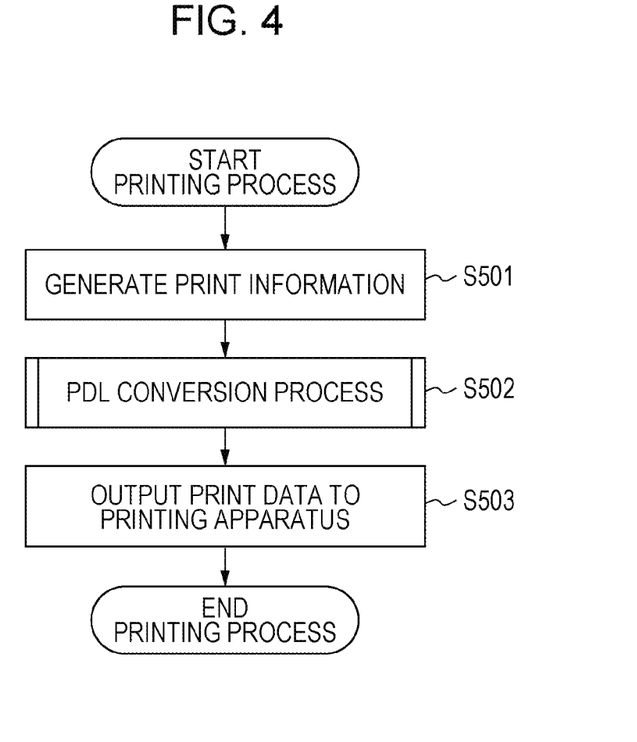
FIG. 4 is a flow chart of a printing process according to an embodiment.

With referent to FIG. 4, a description is given below as to a process in which the information processing apparatus 10 generates print data, to be transmitted to the printing apparatus 6, from color image data generated by the application, and the information processing apparatus 10 transmits the generated data to the printing apparatus 6. Examples of applications include a document generation application, a presentation generation application, and the like. A program for executing the process shown in the flow chart of FIG. 4 is stored in the auxiliary storage apparatus 3. The process is realized by the CPU 1 by executing the program. The process shown in FIG. 4 is started when a user issues an instruction to start printing via an application screen or when a user issues an instruction to start printing via an input apparatus such as a keyboard connected to the information processing apparatus.

The print data control unit 18 generates PJL data that is print information based on the print settings set by a user (S501). The print settings set by the user are, for example, a single-sided/double-sided setting in printing, a setting in aggregate printing (N-in-1 printing setting), and/or the like. Note that the print settings include color settings in printing.

The drawing command control unit 14 executes the PDL conversion process to generate PDL data based on the command analyzed by the drawing command analysis unit 17 (S502). Details of processes performed by the drawing command analysis unit 17, the drawing command generation unit 16, and the grayscale conversion unit 15 will be described later with reference to FIG. 5. In a case where printing of a high-discrimination grayscale image is instructed, the information processing apparatus generates, in S502, high-discrimination grayscale PDL data.

Figure 11:
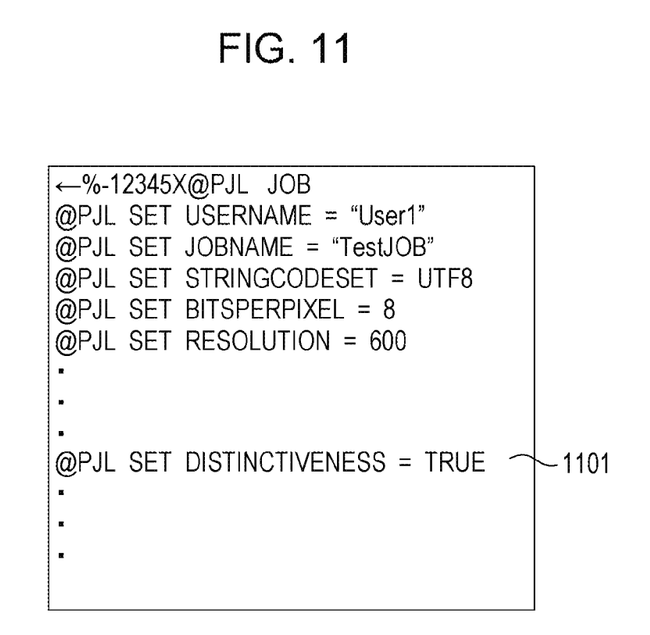
FIG. 11 is a diagram illustrating an example of print data according to an embodiment.

The print data transmission/reception unit 19 outputs, to the printing apparatus 6, the print data including the PJL data generated by the print data control unit 18 and the PDL data generated in S502 (S503). The PJL data is transmitted at the beginning of the job. Thereafter, the print data transmission/reception unit 19 accumulates the PDL data generated in S502 until the accumulated amount of data reaches a predetermined data size, and transmits the PDL data in units of the predetermined data sizes. The print data transmission/reception unit 19 repeatedly generates the PDL data in S502 and transmits the generated PDL data in S503 until the print job is completed. FIG. 11 illustrates an example of print data generated according to the present embodiment. At the top of the print data, a name of a user who submitted a print job, a name of the job, and/or the like are described. A flag 1101 indicates whether or not the data has been subjected to high-discrimination grayscale conversion. When the flag is set to TRUE, this indicates that the PDL data included in the print data has been subjected to high-discrimination grayscale conversion. When the flag is set to FALSE, this indicates that the PDL data included in the print data has not been subjected to high-discrimination grayscale conversion. The print data control unit 18 refers to the setting made via a UI of the printer driver, and if the setting specifies high-discrimination grayscale conversion, the print data control unit 18 sets the flag 1101 to TRUE. The provision of the flag 1101 makes it possible to prevent print data from being again subjected to high-discrimination grayscale conversion when the printing apparatus receives the print data.

The process performed by the information processing apparatus to generate print data to be transmitted to the printing apparatus has been described above. The printing apparatus 6 analyzes the PDL data output from the information processing apparatus 10 and performs image processing such as rendering, halftone processing, and/or the like. The printing apparatus 6 then prints the generated image data on a sheet.

Figure 5:
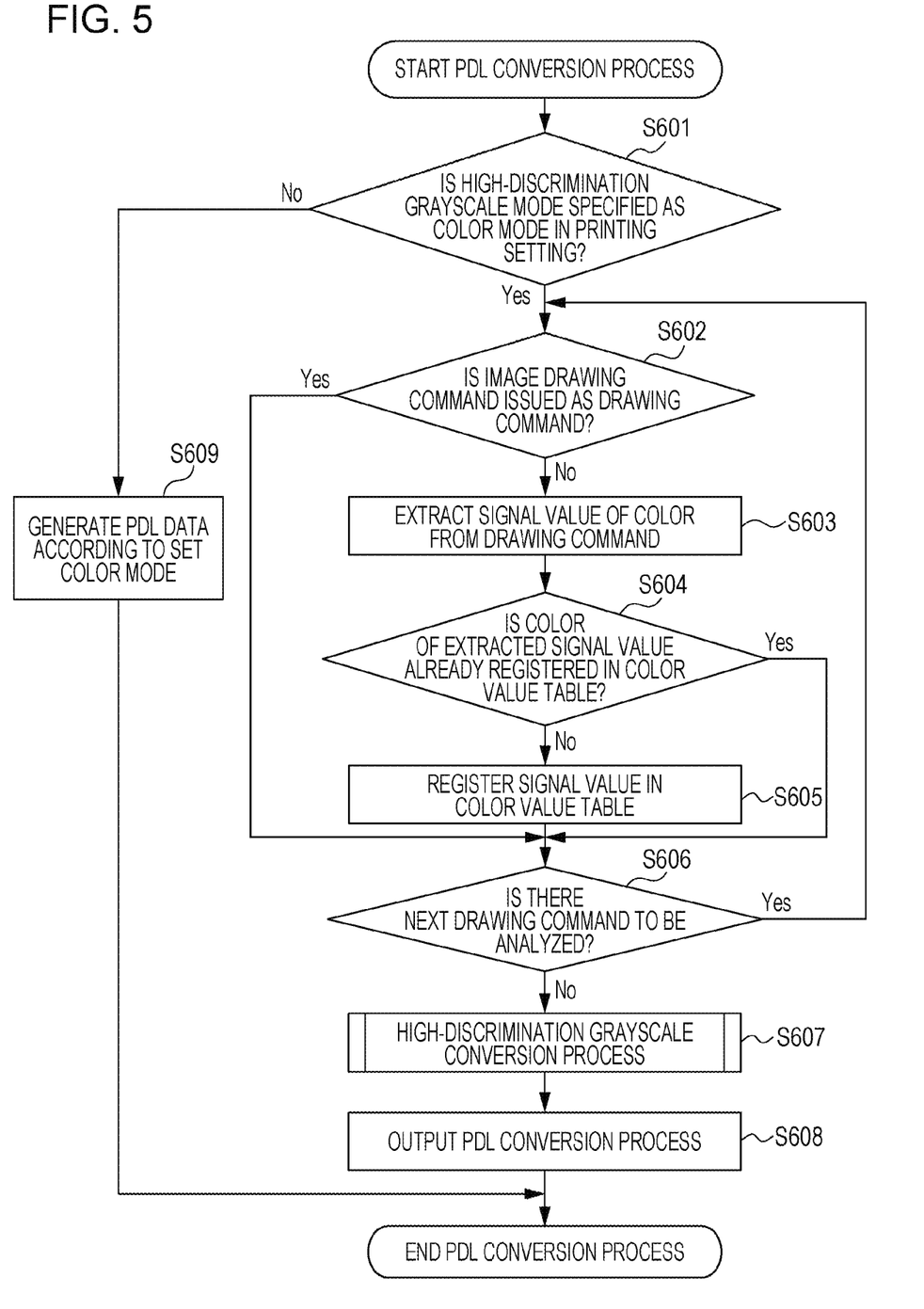
FIG. 5 is a flow chart associated with an entire system according to an embodiment of the present invention.

Next, details of the PDL conversion process executed in S502 shown in FIG. 4 are described below with reference to FIG. 5. A program for executing the process shown in FIG. 5 is stored in the ROM 7, and the process is realized by the CPU 1 by executing the program loaded in the RAM 2.

The drawing command analysis unit 17 refers to the print setting and determines whether or not the high-discrimination grayscale printing is specified (S601). The drawing command analysis unit 17 performs grayscale conversion based on the setting of the color mode included in the drawing command and the setting of whether or not to perform high-discrimination grayscale conversion. In a case where grayscale is specified as the color mode in the setting and furthermore execution of high-discrimination grayscale conversion is specified, the drawing command analysis unit 17 determines that the high-discrimination grayscale is specified. In a case where the high-discrimination grayscale is specified, the grayscale conversion unit 15 advances the process to S602. However, in a case where a mode other than the high-discrimination grayscale is specified, the grayscale conversion unit 15 advances the process to S609.

Figure 6A:
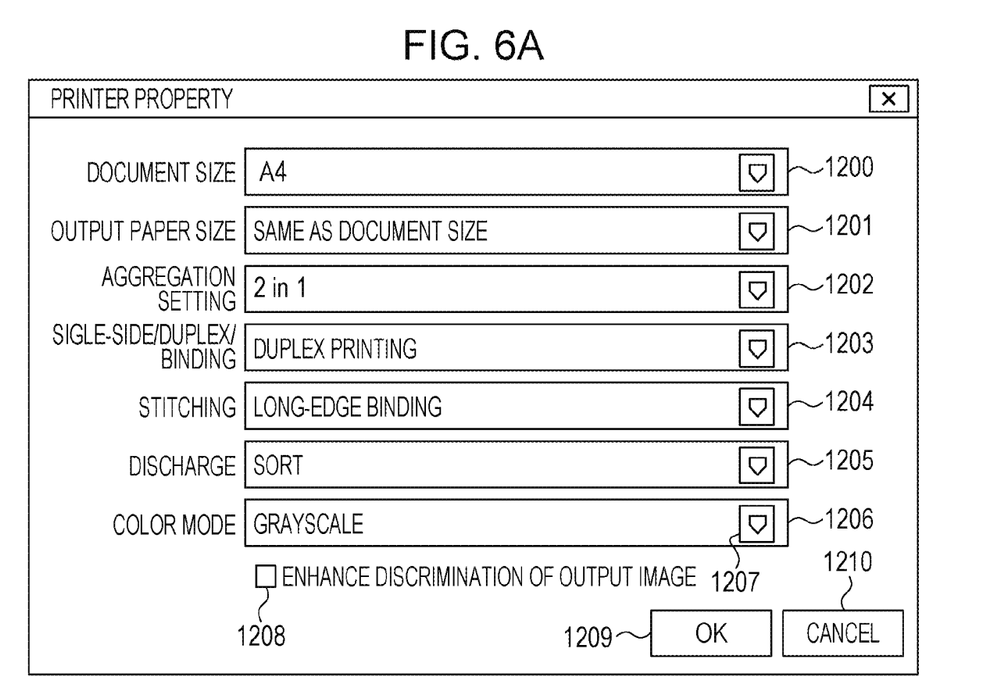
FIG. 6A is a diagram illustrating an example of a first print setting screen provided by a printer driver according to an embodiment.
Figure 6B:
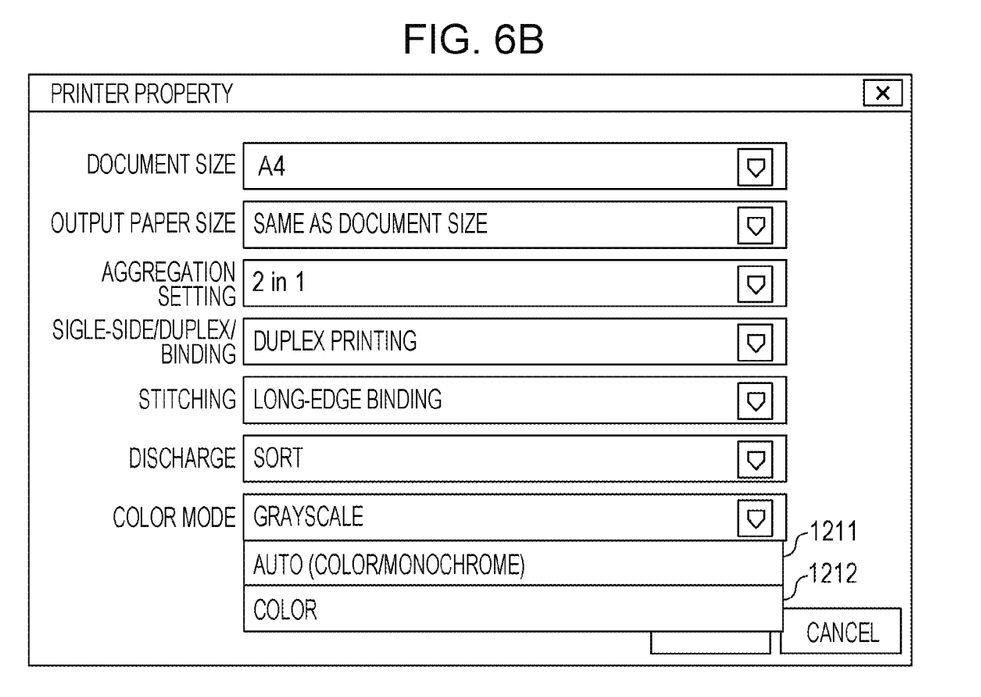
FIG. 6B is a diagram illustrating an example of a second print setting screen provided by the printer driver according to the embodiment.

A user is allowed to perform print settings via a print setting screen of the printer driver 11 shown in FIG. 6A. Input fields 1200 to 1206 are fields for inputting settings of respective setting items. An input field 1206 is for setting a color mode. When the user selects a button 1207, setting values allowed to be selected in the color mode are displayed as shown in FIG. 6B. In the present embodiment, the user is allowed to select a mode from a group including auto (color/monochrome), color, and grayscale. When an "auto (color/monochrome)" mode 1211 is set, the printing apparatus 6 automatically selects a color mode depending on input image data. In a "color" mode, 1212, input image data is printed with a plurality of color toners such as CMYK toners. A "grayscale" mode is currently input in the input field 1206. In this mode, the input image data is converted into grayscale image data and printed with only K toner. A check box 1208 in FIG. 6A is for setting whether or not the printer driver 11 generates a high-discrimination output image. The check box 1208 is allowed to be selected (checked) only when "grayscale" is selected in the color mode input field 1206. In a case where the user sets the color mode to grayscale and selects the check box 1208, the printer driver 11 generates high-discrimination grayscale PDL data. In a case where the user sets the color mode to grayscale but does not select the check box 1208, the printer driver 11 generates grayscale PDL data in the NTSC mode or other known techniques. Thus, the printer driver 11 sets a generation method for generating gray image data from color data by selecting a method from a group including at least a first generation method (NTSC or the like) and a second generation method (for enhancing discrimination) different from the first generation method. In the first generation method, a gray value is determined based on an average value or a weighted average value of RGB values of colors included in color data. For example, the gray conversion method may be one of an RGB average method, an NTSC method, and an sRGB method. In the second generation method, the gray PDL data is generated such that the difference among the gray values obtained after conversion is greater than or equal to a value determined based on the number of colors (so as to provide discrimination). Alternatively, the second generation method may be a method in which gray color values are determined such that there is an equal difference between adjacent gray values included in the gray image data. Details of the second generation method will be described later with reference to FIGS. 10A to 10D. In the example described above with reference to FIG. 6A, by way of example but not limitation, the check box is used to make setting for enhancing the discrimination. Alternatively, for example, a pull-down menu or a radio button may be used to select the generation method from the first generation method or the second generation method. In a case where the grayscale is selected in the color mode, the information processing apparatus 10 converts the image data with a plurality of channels into a single channel signal value of only K. The achromatic color signal value (a gray value) corresponding to the K toner indicates the shade of black according to the value. A larger signal value means lighter black, and a smaller signal value means darker black.

When the user finishes the print settings, the user selects an "OK" button 1209 to complete the print settings. A "Cancel" button 1210 is for canceling the settings displayed on the display unit and returning the settings to the previous settings. After the print settings are completed, the user inputs a print execution instruction via the screen displayed by the printer driver or the screen displayed by the application.

In S601, the grayscale conversion unit 15 refers to the color mode set via the print setting screen shown in FIG. 6, and determines whether or not the high-discrimination grayscale conversion is specified.

The drawing command analysis unit 17 determines whether or not the input drawing command is an image data drawing command (S602). In a case where it is determined that the command is an image data drawing command, the grayscale conversion unit 15 advances the processing to S606. However, in a case where it is determined that the command is not an image data drawing command, the grayscale conversion unit 15 advances the processing to S603. In S602, the grayscale conversion unit 15 refers to property information associated with each drawing command, and determines whether the drawing command of interest is an image data drawing command. In addition to images, properties indicated by the property information include text, graphics such as diagrams, lines, and/or the like. Image data is data of an image such as photographic image data. For the image data, it may be important to prevent the gradation of the original image from being lost via the grayscale conversion. For this purpose, even when the high-discrimination grayscale conversion is instructed, grayscale conversion by a known method is executed. In the present embodiment, colors are extracted from a predetermined object that is not image data, and replaced with achromatic colors signal values set based on the number of the extracted colors thereby generating high-discrimination grayscale image data. This makes it possible to generate a high-discrimination grayscale image such that gradation is well maintained for image data and high discrimination is achieved for predetermined types of objects such as text or graphics.

Figure 7:
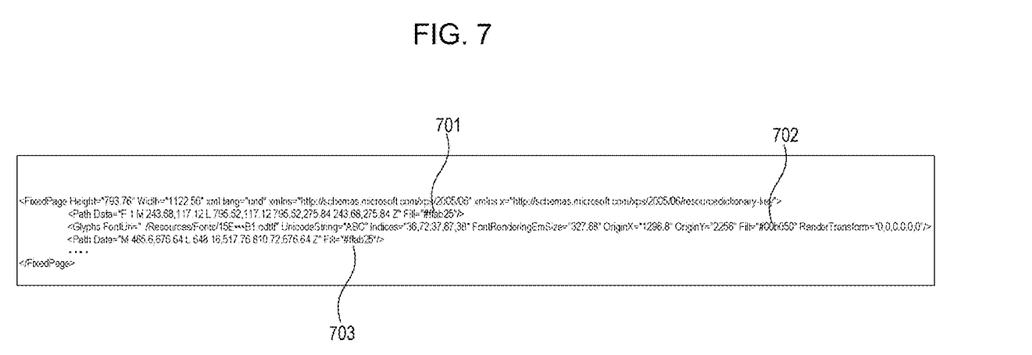
FIG. 7 is a diagram illustrating an example of a drawing command input to a driver according to an embodiment.

The grayscale conversion unit 15 extracts a color signal value from the drawing command being analyzed (S603). A specific method is described below with reference to FIG. 7. FIG. 7 illustrates an example of drawing data (XPS) input to the printer driver 11. In the present embodiment, drawing data is one of the image data, and includes a drawing command indicating an image to be drawn. The grayscale conversion unit 15 extracts "ffab25" as a color value from the drawing command 701. "ffab25" is a hexadecimal representation for chromatic signal values of R=255, G=171, and B=37.

Figure 8A:
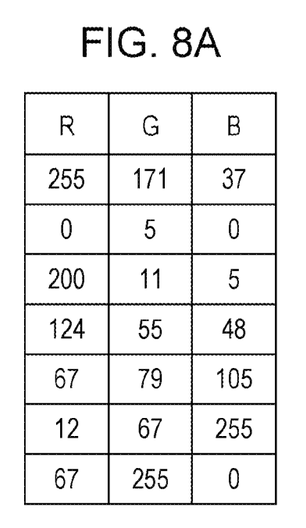
FIG. 8A is a diagram showing an example of a color value table according to an embodiment.

Next, the grayscale conversion unit 15 determines whether or not the extracted color is already registered in the color value table stored in the RAM 2 (S604). In a case where the extracted color is already registered in the color value table, the grayscale conversion unit 15 advances the process to S606. In a case where the extracted color is not registered in the color value table, the grayscale conversion unit 15 registers the extracted signal value in the color value table (S605). No color is registered in the color value table when analyzing is being made for a first drawing command, and thus R=255, G=171, B=37 are registered in a first line of the color value table as shown in FIG. 8A.

The grayscale conversion unit 15 determines whether there is a drawing command to be analyzed (S606). In the example shown in FIG. 7, the image data includes a drawing command 702 following the drawing command 701, and thus the grayscale conversion unit 15 returns the process to S602. Then, the grayscale conversion unit 15 executes the process in S602 to S605 on the drawing command 702. The color value "00b050" extracted from the drawing command 702 is a hexadecimal representation for chromatic signal values of R=0, G=5, and B=0. R=0, G=5, and B=0 are not registered in the color value table, and thus the grayscale conversion unit 15 registers this color value in the color value table.

Furthermore, the grayscale conversion unit 15 performs the same processing on a drawing command 703. A color value "ffab25" is extracted from the drawing command 703. This color value is already registered in the color value table. In this case, the grayscale conversion unit 15 determines that the signal value extracted in S604 is a signal value already registered in the color value table and advances the process to S606.

In this embodiment, when it is determined in S606 that the process up to S606 is completed for drawing commands included in one print job input from the application, the grayscale conversion unit 15 advances the process to S607. Alternatively, the process from S602 to S606 may be performed in units of pages such that when the process up to S606 is completed for drawing commands included in one page, the grayscale conversion unit 15 may advance the process to S607.

In a case where it is determined in S606 that there is no more drawing command to be analyzed, the grayscale conversion unit 15 advances the process to S607. The grayscale conversion unit 15 executes a high-discrimination grayscale conversion process for calculating an achromatic color signal value corresponding to each color included in the input image data (S607). The process performed in S607 by the grayscale conversion unit 15 will be described later with reference to FIG. 9.

The drawing command generation unit 16 converts each color included in the drawing command into an achromatic color signal value obtained in S607, thereby generating PDL data for output (S608). The drawing command generation unit 16 analyzes drawing commands in the input image data sequentially in the order starting from the first drawing command. The drawing command generation unit 16 acquires an RGB value included in each drawing command. The drawing command generation unit 16 then refers to the color value table and replaces the RGB value included in each drawing command with a one-channel signal value corresponding to an achromatic color thereby generating PDL data. In the present embodiment, the one-channel signal value corresponding to the achromatic color is a one-channel signal value using K (black) toner.

On the other hand, in a case where it is determined in S601 that high-discrimination grayscale printing is not set, the drawing command analysis unit 17 analyzes the drawing command and generates PDL data corresponding to the color mode set by the drawing command generation unit 16 (S609). In a case where "color" is set as the color mode, the drawing command generation unit 16 generates PDL data for printing an image with a plurality of toners such as YMCK toners. When use of normal grayscale conversion is specified in the setting, the drawing command generation unit 16 generates PDL data using a known method such as the NTSC method.

Figure 9:
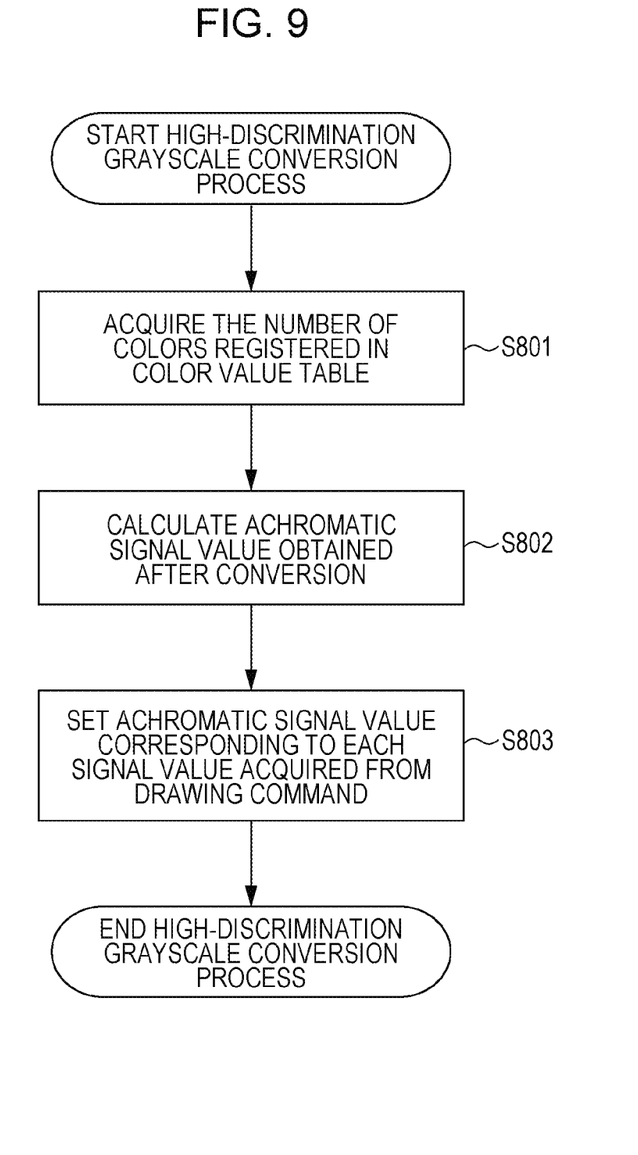
FIG. 9 is a flow chart illustrating a high-discrimination grayscale conversion process according to an embodiment.

FIG. 9 shows details of the process of generating high-discrimination grayscale image data described in S607 of FIG. 5. A program for executing the process shown in FIG. 9 is stored in the ROM 7 or the like, and the process is realized by the CPU 1 by executing the program loaded in the RAM 2. Here, it is assumed by way of example that signal values of seven colors are registered in the color value table as shown in FIG. 8A.

The grayscale conversion unit 15 acquires the number of colors registered in the color value table (S801). More specifically, the grayscale conversion unit 15 refers to the color value table stored in the RAM 2 and acquires the number of colors registered in the color value table. For example, when the color value table shown in FIG. 8 is stored in the RAM 2, N=7 is acquired as the number of colors.

Figure 10A:
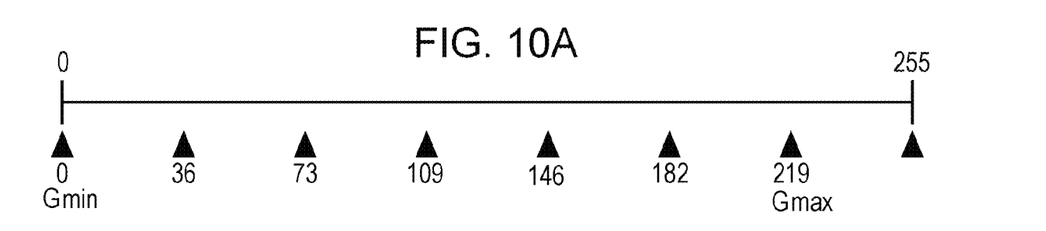
FIG. 10A is a schematic diagram illustrating achromatic color signal values according to an embodiment.

Based on the number of colors acquired in S801, the grayscale conversion unit 15 calculates an achromatic color signal value to be used after the grayscale conversion (S802). More specifically, a range of signal values from 0 to 225 is equally divided into as many divisions as the number N of colors acquired in S801, and signal values at boundaries of divisions are used as converted achromatic color signal values. In a case where N=7, achromatic color signal values are given by 0, 36, 73, 109, 146, 182, and 219 in order from the smallest value. In the present embodiment, the smaller the achromatic color signal value, the darker the achromatic color, and the larger the signal value, the lighter the achromatic color. FIG. 10A illustrates a schematic diagram showing achromatic color signal values set by the method according to the present embodiment. Gmin is the minimum value of the achromatic color signal values used after the grayscale conversion, and Gmax is the maximum value of the achromatic color signal values used after the grayscale conversion.

Figure 8B:
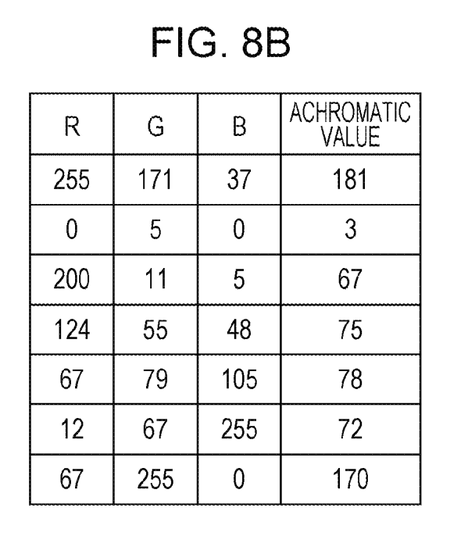
FIG. 8B is a diagram illustrating an example of a table indicating a correspondence between each color value of a color value table and an achromatic color value.
Figure 8C:
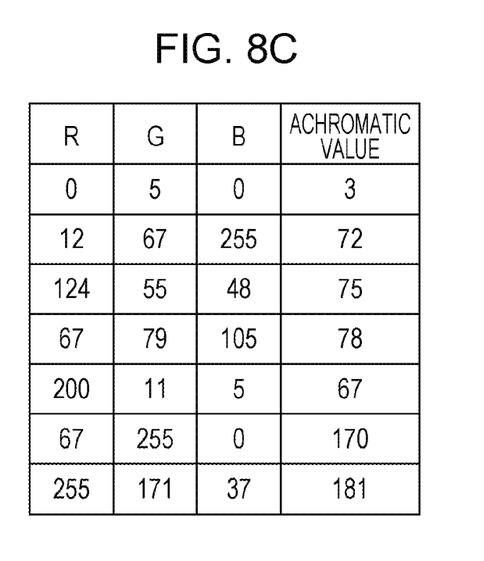
FIG. 8C is a diagram illustrating an example of a color value table obtained after sorting is performed according to achromatic color values.
Figure 8D:
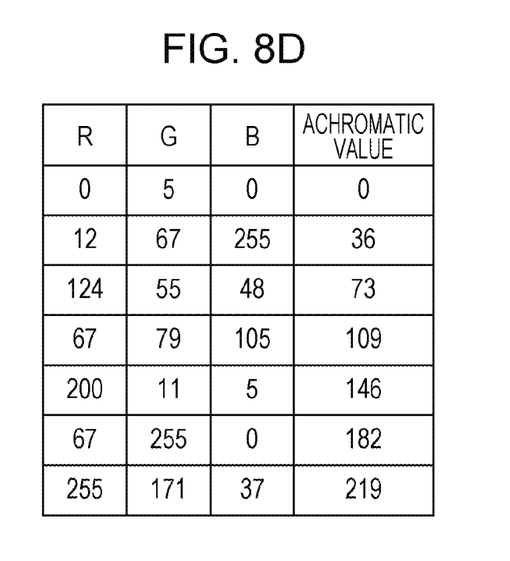
FIG. 8D is a diagram illustrating an example of a table of signal values of achromatic colors used for improving discrimination.

The grayscale conversion unit 15 sets the signal values acquired from the drawing commands to corresponding achromatic color signal values obtained in S802 (S803). The grayscale conversion unit 15 converts each color signal value registered in the color value table into an achromatic color signal value using a known method. In the present embodiment, an achromatic color signal value is obtained by substituting an RGB value into Grey=0.298912R+0.586611G+0.114478B. The achromatic color signal values are obtained, as shown in FIG. 8B, from the signal values of the respective colors. The grayscale conversion unit 15 sorts the colors registered in the color value table in ascending order of the achromatic color signal value. FIG. 8C illustrates a color value table obtained after the sorting is performed. Finally, the grayscale conversion unit 15 assigns the achromatic color signal values set in S802 to the respective color signal values in ascending order of the achromatic color signal values starting with the smallest achromatic color signal value. Thus, a color value table shown in FIG. 8D is obtained in which achromatic color signal values used in grayscale conversion for enhancing discrimination are assigned. Thus, the process described above with reference to the flow chart shown in FIG. 9 is completed.

In the method described above with reference to FIG. 9, a value range from 0 to 255 is equally divided into as many divisions as the number of colors registered in the color value table thereby assigning values used as the achromatic color signal values after the high-discrimination grayscale conversion. In addition to the above method, other methods may be used to perform high-discrimination grayscale conversion, as described below.

Figure 10B:
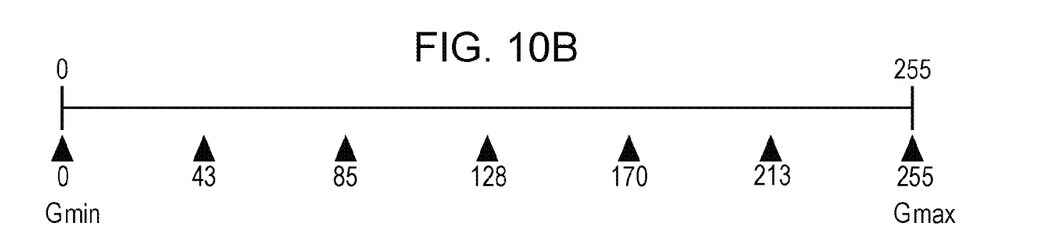
FIG. 10B is a schematic diagram illustrating an example in which achromatic color signal values are determined for a case where a range of signal values from 0 to 255 is equally divided into N−1 divisions, and signal values at respective boundaries of the N−1 divisions are used.

In a case where a color with R=255, G=255, and B=255 is registered in the color value table, the range of the signal values from 0 to 255 may be equally divided into N−1 divisions as shown in FIG. 10B. In this case, the grayscale conversion unit 15 assigns the signal value of R=G=B=255 to a signal value of K=255. Other signal values are assigned such that achromatic color signal values are assigned in the ascending order of achromatic color signal values obtained by a known conversion method.

Figure 10C:
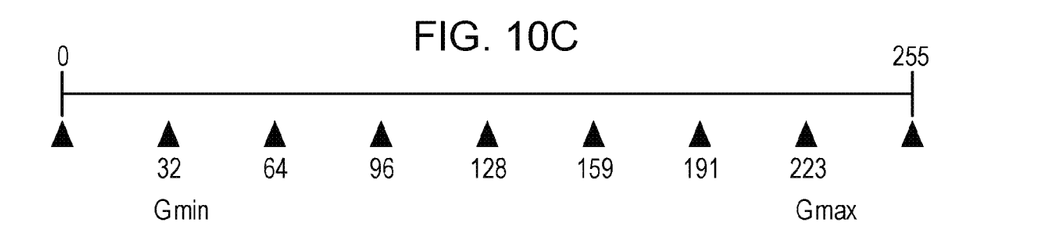
FIG. 10C is a schematic diagram illustrating an example of a set of achromatic color signal values for a case where achromatic colors of K=0 and K=255 are not used after grayscale conversion is performed.
Figure 10D:
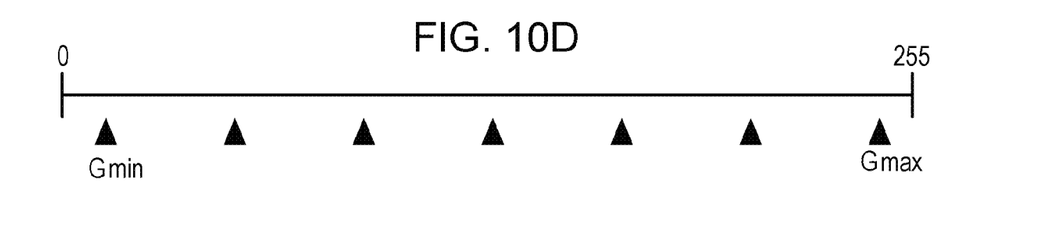
FIG. 10D is a schematic diagram illustrating an example in which a range from Gmin to Gmax is equally divided into N divisions, and values at the respective boundaries of the divisions are used in setting achromatic colors signal values in the grayscale conversion.

Furthermore, the grayscale conversion unit 15 may use the method shown in FIG. 10C or the method shown in FIG. 10D to determine the achromatic color signal value to which each color is converted.

FIG. 10C shows an example in which an achromatic color of K=0 and an achromatic color of K=255 are not used as colors employed after the grayscale conversion. The grayscale conversion unit 15 equally divides the range of values from 0 to 255 into as many division as a number that is greater by one than the number N of colors registered in the color value table. The grayscale conversion unit 15 then assigns signal values excluding K=0 and K=255 to the respective colors. For example, when N=7, the signal values used after the conversion are K=32, 64, 96, 128, 159, 191 and 223.

FIG. 10D shows an example in which, as with the example in FIG. 10C, the achromatic color of K=0 and the achromatic color of K=255 are not used as colors after the grayscale conversion. In FIG. 10D, a value of Gmin and a value of Gmax are determined in advance such that Gmin #0 and Gmax #255. The grayscale conversion unit 15 reads out the values of Gmin and Gmax stored in the ROM 7 or the auxiliary storage apparatus 3, and equally divides the range of values from Gmin and Gmax into N divisions, and sets achromatic color signal values to be used after the grayscale conversion is performed. Note that in the method shown in FIG. 10D, Gmax and Gmin may be variable. For example, the grayscale conversion unit 15 calculates achromatic color signal values from the RGB values registered in the color value table by a known method such as the NTSC method. Of the achromatic color signal values calculated by the grayscale conversion unit 15, the smallest value may be assigned to Gmin and the largest value may be assigned to Gmax.

In the present embodiment, a method of setting achromatic color signal values employed in performing the high-discrimination grayscale conversion is predetermined in advance by selecting one of methods shown in FIGS. 10A to 10D, and the conversion is performed according to the predetermined method. However, the method of determining the achromatic color signal values may be changed based on color signal values registered in the color value table. For example, before the process shown in FIG. 9 is started, the grayscale conversion unit 15 may refer to the color value table to determine whether or not a color of R=G=B=0 is registered. In a case where the color of R=G=B=0 is not registered in the color value table, the grayscale conversion unit 15 selects one of the methods shown in FIGS. 10C and 10D. A decision may be made in advance as to whether the method shown in FIG. 10C or the method shown in FIG. 10D is to be used.

In a case where the color of R=G=B=0 is registered in the color value table, the grayscale conversion unit 15 determines whether or not the color of R=G=B=255 is included in the color value table. In a case where the color value table does not include the color of R=G=B=255, the grayscale conversion unit 15 performs grayscale conversion using the method shown in FIG. 10A. On the other hand, in the case where the color of R=G=B=255 is included in the color value table, the grayscale conversion unit 15 performs grayscale conversion by using the method shown in FIG. 10B. When the original color image data includes black with R=G=B=0 or white with R=G=B=255, the use of the method described in FIG. 10A or FIG. 10B makes it possible to set the corresponding original signal value to K=0 or K=255. As a result, the high-discrimination grayscale conversion can be performed without changing the color in portions where black or white is used in the original image data.

According to the present embodiment, as described above, the number of drawing colors input to the printer driver is stored, and the grayscale conversion table is generated depending on the number of colors, and thus it becomes possible to generate page description language data subjected to the high-discrimination grayscale conversion by the printer driver. Thus, it is allowed to perform high-discrimination grayscale printing without having to generate high-discrimination grayscale image by the printing apparatus. Furthermore, according to the present embodiment, a user is allowed to specify whether or not high-discrimination grayscale conversion is to be performed on gray data by the printer driver.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An information processing apparatus comprising:
   one or more controllers including one or more processors and one or more memories, the one or more controllers configured to:
   input color data;
   cause a display to display a print setting screen for receiving a print setting;
   receive selection of a print mode from among a plurality of print modes including a color print mode and a grayscale print mode on the displayed print setting screen; and
   transmit print data based on the set print mode and the input color data to a printing apparatus,
   wherein, in a state that the grayscale print mode is selected, a predetermined setting for enabling a conversion method in which the input color data is converted into grayscale data while assigning, based on the number of colors used in a page of the input color data, different achromatic values to the colors used in the color data is selectable, and
   wherein, in a state that the color print mode is selected, the predetermined setting is unselectable.

2. An information processing method comprising:
   inputting color data;
   displaying a print setting screen for receiving a print setting;
   receiving selection of a print mode from among a plurality of print modes including a color print mode and a grayscale print mode on the displayed print setting screen; and
   transmitting print data based on the set print mode and the input color data to a printing apparatus,
   wherein, in a state that the grayscale print mode is selected, a predetermined setting for enabling a conversion method in which the input color data is converted into grayscale data while assigning, based on the number of colors used in a page of the input color data, different achromatic values to the colors used in the color data is selectable, and
   wherein, in a state that the color print mode is selected, the predetermined setting is unselectable.

3. The information processing method according to claim 2; further comprising:
   converting, using the conversion method, the input color data into the grayscale data; and
   generating the print data based on the grayscale data,
   wherein the generated print data is transmitted to the printing apparatus.

4. The information processing method according to claim 2, wherein, in a state that the grayscale print mode is not selected, the predetermined setting is unselectable.

5. The information processing method according to claim 2,
   wherein, in a case where the predetermined setting is selected, the input color data is converted into the grayscale data by using the conversion method, and
   wherein, in a case where the predetermined setting is not selected, the input color data is converted into the grayscale data by using a NTSC conversion method.

6. The information processing method according to claim 2, wherein the print setting screen is a screen for setting an output sheet size.

7. The information processing method according to claim 2, wherein the assigned grayscale values are determined based on the number of colors used in the page of the input color data.

8. A non-transitory computer-readable storage medium storing a program for causing a computer to execute a method, the method comprising:
  inputting color data;
  displaying a print setting screen for receiving a print setting;
  receiving selection of a print mode from among a plurality of print modes including a color print mode and a grayscale print mode on the displayed print setting screen; and
  transmitting print data based on the set print mode and the input color data to a printing apparatus,
  wherein, in a state that the grayscale print mode is selected, a predetermined setting for enabling a conversion method in which the input color data is converted into grayscale data while assigning, based on the number of colors used in a page of the input color data, different achromatic values to the colors used in the color data is selectable, and
  wherein, in a state that the color print mode is selected, the predetermined setting is unselectable.

9. The non-transitory computer-readable storage medium according to claim 8, the method further comprising:
  converting, using the conversion method, the input color data into the grayscale data; and
  generating the print data based on the grayscale data,
  wherein the generated print data is transmitted to the printing apparatus.

10. The non-transitory computer-readable storage medium according to claim 8, wherein, in a state that the grayscale print mode is not selected, the predetermined setting is unselectable.

11. The non-transitory computer-readable storage medium according to claim 8,
  wherein, in a case where the predetermined setting is selected, the input color data is converted into the grayscale data by using the conversion method, and
  wherein, in a case where the predetermined setting is not selected, the input color data is converted into the grayscale data by using a NTSC conversion method.

12. The non-transitory computer-readable storage medium according to claim 8, wherein the print setting screen is a screen for setting an output sheet size.

13. The non-transitory computer-readable storage medium according to claim 8, wherein the assigned grayscale values are determined based on the number of colors used in the page of the input color data.

* * * * *